US008487857B2

(12) United States Patent
Kim et al.

(10) Patent No.: US 8,487,857 B2

(45) Date of Patent: Jul. 16, 2013

(54) LIQUID CRYSTAL DISPLAY DEVICE AND DRIVING METHOD THEREOF WITH POLARITY INVERSION AND DUMMY PIXELS

(75) Inventors: Binn Kim, Seoul (KR); Nam Wook Cho, Gunpo-si (KR); Sung Hak Jo, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 1104 days.

(21) Appl. No.: 11/635,541

(22) Filed: Dec. 8, 2006

(65) Prior Publication Data

US 2008/0036721 A1 Feb. 14, 2008

(30) Foreign Application Priority Data

May 1, 2006 (KR) ........................ 10-2006-0039330

(51) Int. Cl.
*G09G 3/36* (2006.01)
*G06F 3/038* (2006.01)
*G02F 1/141* (2006.01)

(52) U.S. Cl.
USPC ................................ 345/96; 345/209; 349/37

(58) Field of Classification Search
USPC ............. 345/87–103, 209; 349/37, 42, 46–47
See application file for complete search history.

(56) References Cited

U.S. PATENT DOCUMENTS 5,719,648 A * 2/1998 Yoshii et al. .................... 349/42
6,160,535 A * 12/2000 Park ................................ 345/88
6,366,271 B1 * 4/2002 Kohno et al. ................. 345/103
2003/0071943 A1 4/2003 Choo et al.
2003/0151584 A1 * 8/2003 Song et al. .................... 345/100
2003/0197672 A1 10/2003 Yun et al.
2004/0012442 A1 1/2004 Ichitsubo et al.
2004/0239602 A1 * 12/2004 Kim et al. ....................... 345/87
2004/0239605 A1 * 12/2004 Wang et al. ..................... 345/96
2004/0239667 A1 12/2004 Takahashi
2004/0263466 A1 12/2004 Song et al.
2005/0162372 A1 * 7/2005 Hashimoto ..................... 345/99
2005/0190134 A1 9/2005 Wang et al.
2005/0195148 A1 * 9/2005 Iisaka ............................. 345/98
2005/0200585 A1 * 9/2005 Igarashi et al. ................. 345/93
2005/0259067 A1 * 11/2005 Cheng ........................... 345/103
2006/0007094 A1 * 1/2006 Kang et al. ...................... 345/98
2006/0041805 A1 2/2006 Song
2006/0109227 A1 * 5/2006 Park ................................ 345/98
2006/0164350 A1 * 7/2006 Kim et al. ....................... 345/87

FOREIGN PATENT DOCUMENTS

| | | |
|---|---|---|
| DE | 197 11 967 | 10/1997 |
| DE | 102 59 326 | 8/2003 |
| EP | 1 143 406 | 10/2001 |
| JP | 09-016132 | 1/1997 |
| JP | 2003-233362 | 8/2003 |
| JP | 2004-341134 | 12/2004 |
| WO | WO 2006/030388 | 3/2006 |

* cited by examiner

*Primary Examiner* — Bipin Shalwala
*Assistant Examiner* — Keith Crawley
(74) *Attorney, Agent, or Firm* — McKenna, Long & Aldridge, LLP.

(57) ABSTRACT

A liquid crystal display (LCD) device includes a data drive circuit that inverts polarities of data every 2k horizontal periods (k is an integer not less than 2); and an LCD panel including a plurality of data lines and a plurality of gate lines crossing each other to define a plurality of pixels, each pixel including a switching device, wherein source electrodes of the switching devices in the pixels arranged in a vertical direction are connected to two different data lines.

18 Claims, 12 Drawing Sheets

LIQUID CRYSTAL DISPLAY DEVICE AND DRIVING METHOD THEREOF WITH POLARITY INVERSION AND DUMMY PIXELS

This application claims the benefit of Korean Patent Application No. P2006-0039330, filed on May 1, 2006, which is hereby incorporated by reference for all purposes as if fully set forth herein.

BACKGROUND OF THE INVENTION

1. Field of the Invention

The present invention relates to a liquid crystal display device, and more particularly to a liquid crystal display device and method for driving the same that can reduce power consumption.

2. Discussion of the Related Art

Liquid crystal display (LCD) devices control the light transmittance of pixels in accordance with video signals to display images. Active matrix type LCD devices are advantageous in displaying moving images because of a switching device in each pixel. Thin film transistors (hereinafter, referred to as "TFTs") are mainly used for the switching device.

LCD devices periodically invert the polarity of data charged in pixels to reduce flickers and residual image defects. The inversion method is classified into a line inversion method in which the polarity of one horizontal line of pixels is opposite to the polarity of neighboring line of pixels, a column inversion method in which the polarity of one vertical line of pixels is opposite to the polarity of neighboring line of pixels and a dot inversion method in which the polarity of a pixel is opposite to the polarity of neighboring pixels in horizontal and vertical line directions.

FIG. 1 is a schematic view of a plurality of pixels illustrating the dot inversion method according to the related art.

Referring to FIG. 1, in the dot inversion method, the polarity of data charged in a pixel is opposite to the polarity of data charged in neighboring pixels in horizontal and vertical line directions. Also, the polarities of the data of the pixels are inverted for each frame Fn-1, Fn.

In order to reduce flickers in both the vertical and horizontal directions and to reduce power consumption, a two dot inversion method is recently suggested and widely used for LCD devices. FIGS. 2 and 3 are schematic views illustrating the two dot inversion method according to the related art. FIG. 4 shows the polarities of data applied to the data lines in the two dot inversion method according to the related art.

Referring to FIGS. 2 to 4, in the two dot inversion method, two pixels neighboring in the vertical direction is treated as a unit of pixels so that the polarity of data charged in two pixels that are neighboring in the vertical direction is opposite to the polarity of data charged in neighboring units of pixels in horizontal and vertical line directions. As in the dot inversion method, the polarities of the data charged in the pixels are also inverted for each frame Fn-1, Fn.

Recently, as the resolution of LCD devices becomes higher, the number of pixels connected to a one horizontal line is increasing. As a result, even with the two dot inversion method, the power consumption of the LCD device is high due to the high driving frequency.

SUMMARY OF THE INVENTION

Accordingly, the present invention is directed to an LCD device and method for driving the same that substantially obviates one or more problems due to limitations and disadvantages of the related art.

An advantage of the present invention is to provide an LCD device and method for driving the same that reduces power consumption Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display (LCD) device includes a data drive circuit that inverts polarities of data every 2k horizontal periods (k is an integer not less than 2); and an LCD panel including a plurality of data lines and a plurality of gate lines crossing each other to define a plurality of pixels, each pixel including a switching device, wherein source electrodes of the switching devices in the pixels arranged in a vertical direction are connected to two different data lines.

In another aspect of the present application, a driving method of a liquid crystal display (LCD) device includes providing an LCD panel wherein a plurality of data lines and a plurality of gate lines cross each other to define a plurality of pixels, each pixel includes a switching device, and source electrodes of the switching devices in the pixels arranged in a vertical direction are connected to two different data lines; and inverting polarities of data every 2k horizontal periods (k is an integer not less than 2) and applying the inverted data to one of the data lines.

In yet another aspect of the present application, A driving method of a display device includes providing a display panel wherein a plurality of data lines and a plurality of gate lines cross each other to define a plurality of pixels, each pixel includes a switching device, and source electrodes of the switching devices in the pixels arranged in a vertical direction are connected to more than two different data lines; and inverting polarities of data corresponding to at least four horizontal periods in each frame and applying the inverted data to one of the data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to embodiments of the present invention, examples of which are illustrated in the accompanying drawings.

Figure 1:
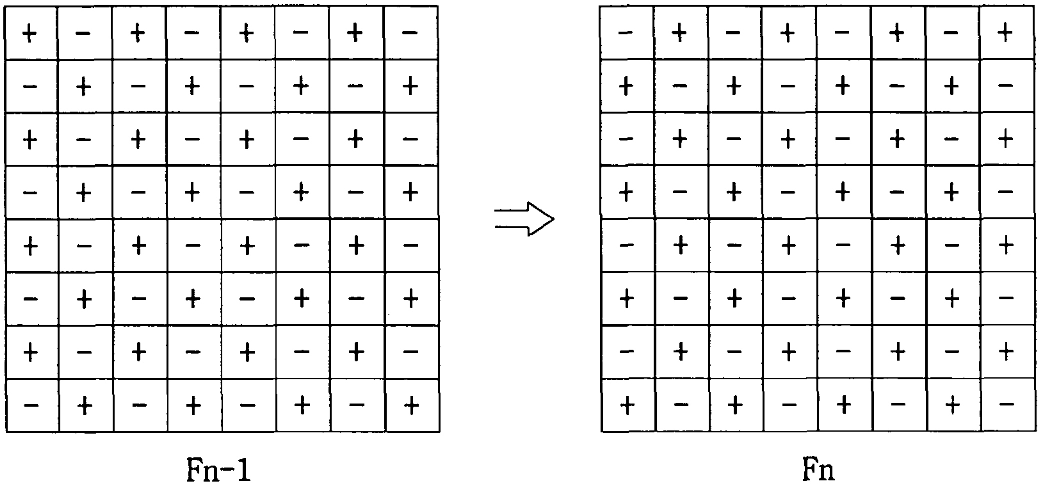
FIG. 1 RELATED ART
FIG. 1 is a schematic view of a plurality of pixels illustrating the dot inversion method according to the related art.
Figure 2:
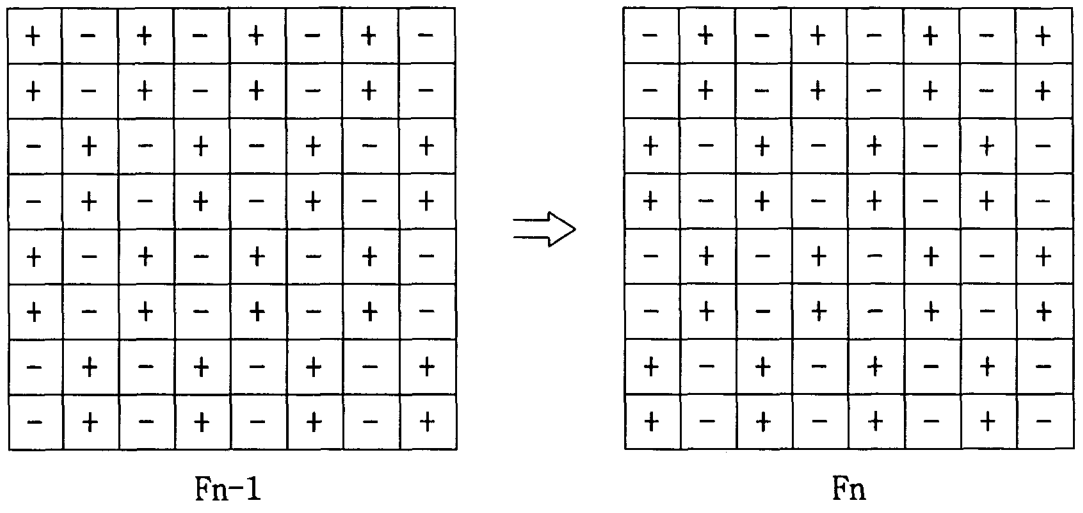
FIG. 2 RELATED ART
FIGS. 2 and 3 are schematic views illustrating the two dot inversion method according to the related art.
Figure 3:
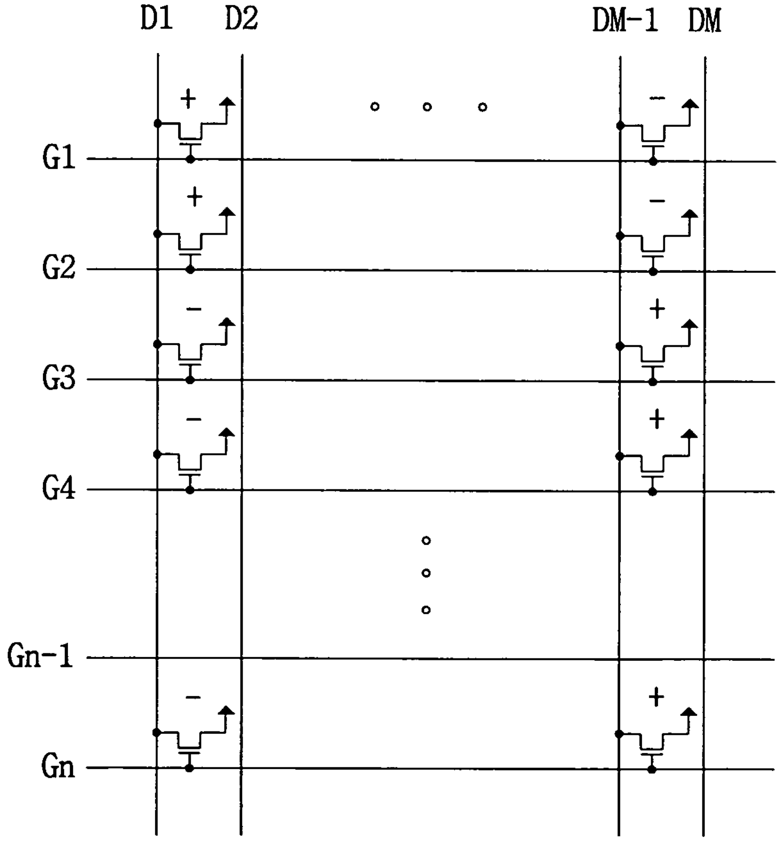
FIG.3 RELATED ART
Figure 4:
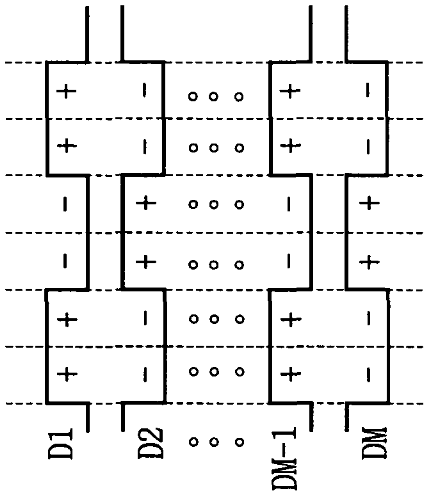
FIG. 4 RELATED ART
FIG. 4 shows the polarities of data applied to the data lines in the two dot inversion method according to the related art.
Figure 5:
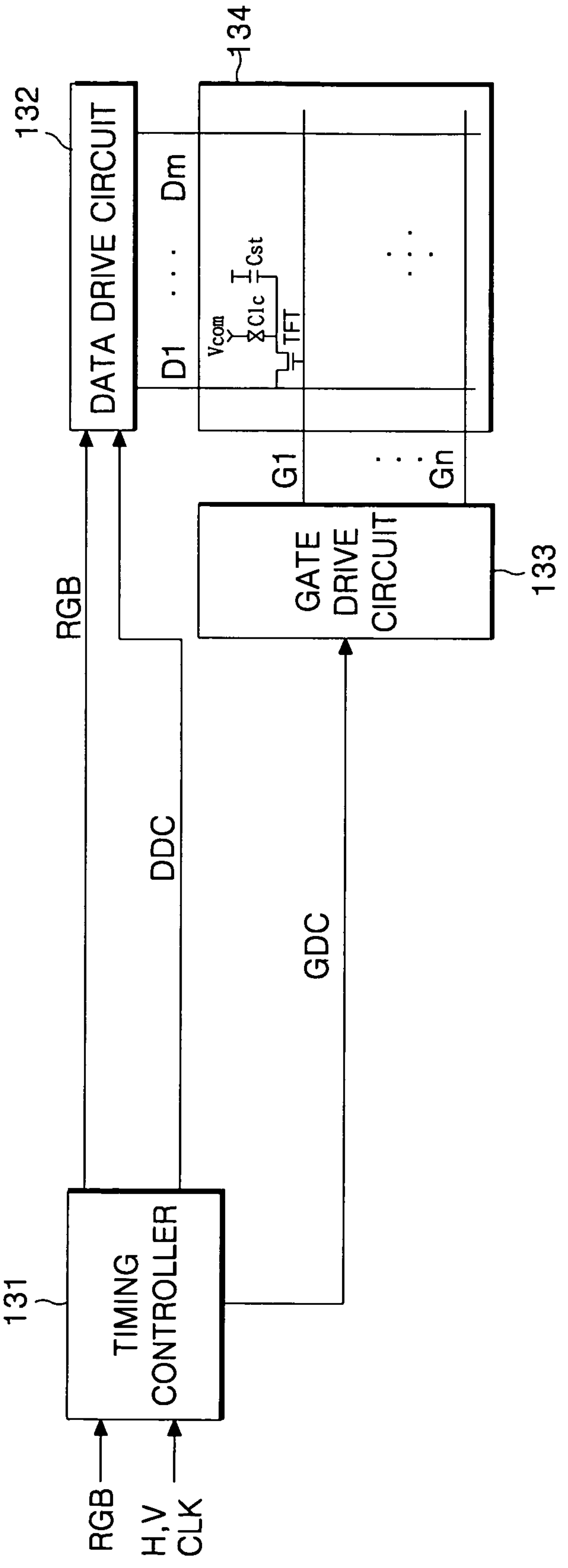
FIG.5 RELATED ART
FIG. 5 is a block diagram illustrating an LCD device according to the present invention.

FIG. 5 is a block diagram illustrating a liquid crystal display (LCD) device according to the present invention.

Referring to FIG. 5, the LCD device includes an LCD panel 134 where data lines D1 to Dm and gate lines G1 to Gn cross each other and a TFT is formed adjacent to each crossing of the gate and data lines for driving a pixel Clc, a data drive circuit 132 for supplying data to the data lines D1 to Dm, a gate drive circuit 133 for supplying scan pulses to the gate lines G1 to Gn, and a timing controller 131 for controlling the data drive circuit 132 and the gate drive circuit 133.

The LCD panel 134 has a liquid crystal between two glass substrates and the data lines D1 to Dm and the gate lines G1 to Gn cross each other on the lower glass substrate. The TFT located adjacent to each crossing of the data line D1 to Dm and the gate line G1 to Gn supplies data of the data line D1 to Dm to the pixel Clc in response to the scan pulse from the gate line G1 to Gn.

To this end, a gate electrode of the TFT is connected to the gate line G1 to Gn and a source electrode of the TFT is connected to the data line D1 to Dm. A drain electrode of the TFT is connected to a pixel electrode of the pixel Clc. A common voltage Vcom is supplied to a common electrode that forms an electric field together with the pixel electrode to control the light transmittance of the pixel Clc.

In the related art LCD device, the source electrodes of the TFTs in a vertical line are all connected to a single data line. In the present invention, a predetermined number of the source electrodes in a vertical line direction are divided to be selectively connected to two adjacent data lines. A construction of an LCD device and method for driving the same according to the present invention will now be described in more detail.

The timing controller 131 generates a gate control signal GDC for controlling the gate drive circuit 133 and a data control signal DDC for controlling the data drive circuit 132 using vertical/horizontal synchronization signals V, H and a clock CLK. The data control signal DDC includes a source start pulse SSP, a source shift clock SSC, a source output signal SOE, a polarity signal POL, etc. The gate control signal GDC includes a gate shift clock GSC, a gate output signal GOE, a gate start pulse GSP, etc.

In the LCD device according to the present invention, the alignment and polarities of data RGB supplied to the data lines D1 to Dm are modulated by the timing controller 131 and the data drive circuit 132. The timing controller 131 aligns data RGB inputted from an image source in accordance with the configuration between the data lines D1 to Dm and the source electrodes of the TFTs using a data alignment circuit (not shown) and supplies the data RGB to the data drive circuit 132. The data driver circuit modulates the data RGB in accordance with the polarity control signal POL and the control data DDC outputted from the timing controller 131 and supplies the modulated data RGB to the data lines D1 to Dm.

The gate drive circuit 133 sequentially supplies the scan pulse to the gate lines G1 to Gn in response to the gate control signal GDC outputted from the timing controller 131.

Figure 6:
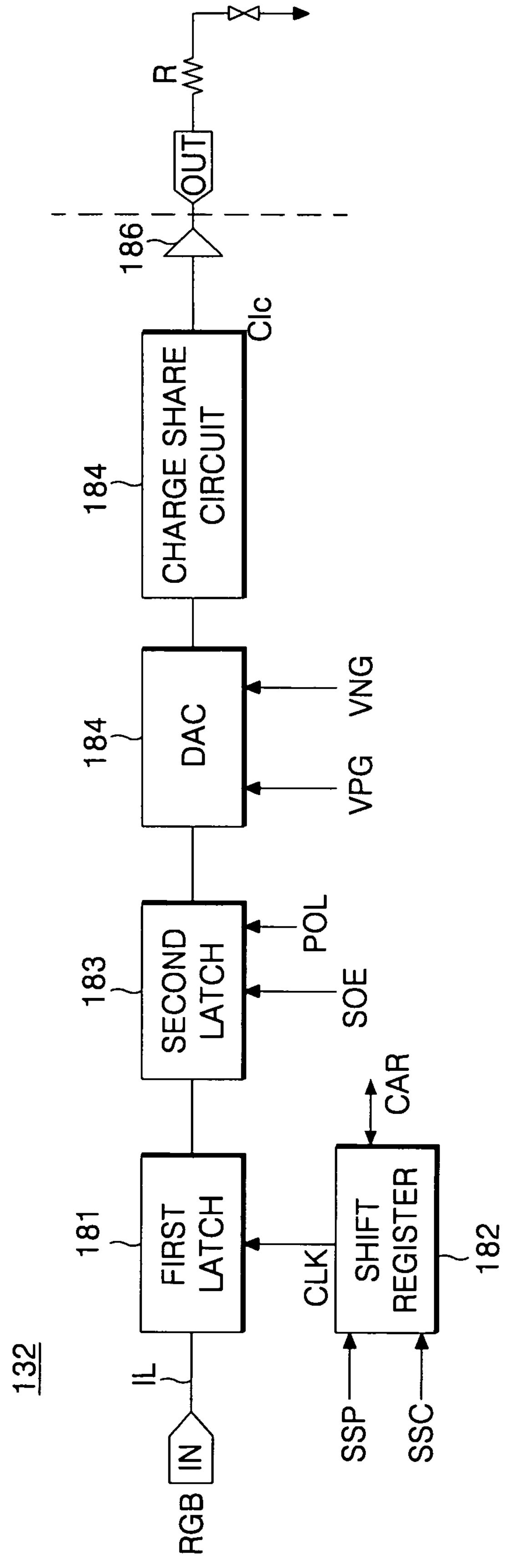
FIG. 6 is a block diagram illustrating the data drive circuit 132 in FIG. 5.

FIG. 6 is a block diagram illustrating the data drive circuit 132 in FIG. 5.

Referring to FIG. 6, the data drive circuit 132 includes a plurality of integrated circuits IC and each IC includes a shift register 182, a first latch 181, a second latch 183, a digital to analog converter 184 (hereinafter, referred to as "DAC"), a charge share circuit 185 and a buffer 186.

The shift register 182 generates a sampling signal by shifting the source start pulse SSP generated from the timing controller 131 in accordance with the source shift clock signal SSC. Further, the shift register 182 shifts the source start pulse SSP and transmits a carry signal CAR to the shift register 182 of the next stage.

The first latch 181 samples and stores the digital data RGB in accordance with the sampling signal inputted from the shift register 182. The second latch 183 latches the digital data RGB inputted from the first latch 181 and then simultaneously outputs the digital data RGB corresponding to one horizontal line to the DAC 184 in response to the source output signal SOE.

The DAC 184 converts the digital data RGB outputted from the second latch 183 into analog data RGB using a positive analog gamma voltage VPG or a negative analog gamma voltage VNG in accordance with the polarity signal POL. According to the present invention, the polarities of the analog data RGB applied to the data line D1 to Dm from the data drive circuit 132 are inverted every 2k horizontal periods (k is an integer not less than 2). Also, the polarities of the analog data RGB applied to the data line D1 to Dm that are adjacent each other in a horizontal direction are inverted.

The charge share circuit 185 supplies a charge share voltage to the data line D1 to Dm through a buffer 186 for a high logic period of the source output signal SOE generated from the timing controller 131. The buffer 186 acts to output the analog data RGB inputted from the DAC 184 to the data line D1 to Dm without the analog data RGB signal being attenuated. The reference numeral 'R' in FIG. 6 is a line resistance between the data line D1 to Dm and the output terminal of the data drive circuit 132.

Figure 7:
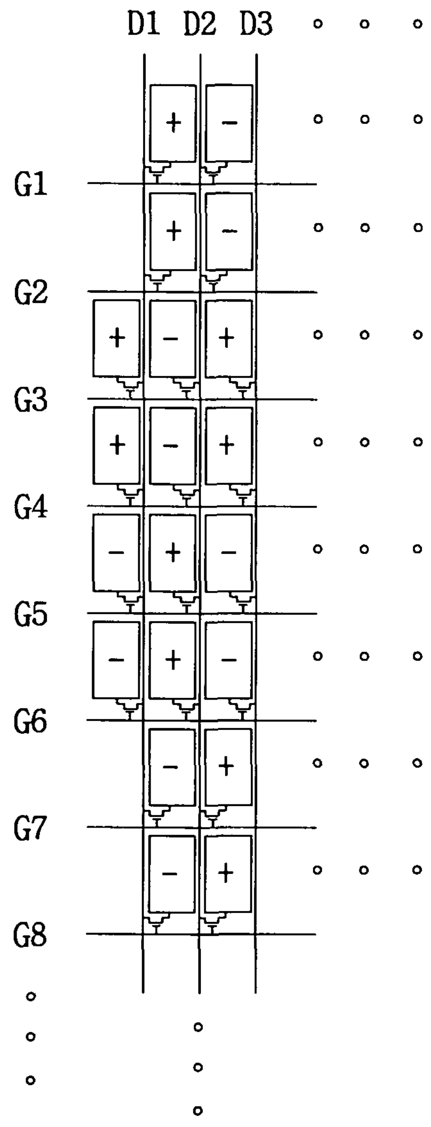
FIG. 7 is a schematic view illustrating the polarities of data applied to an LCD device according to the first embodiment of the present invention.
Figure 8:
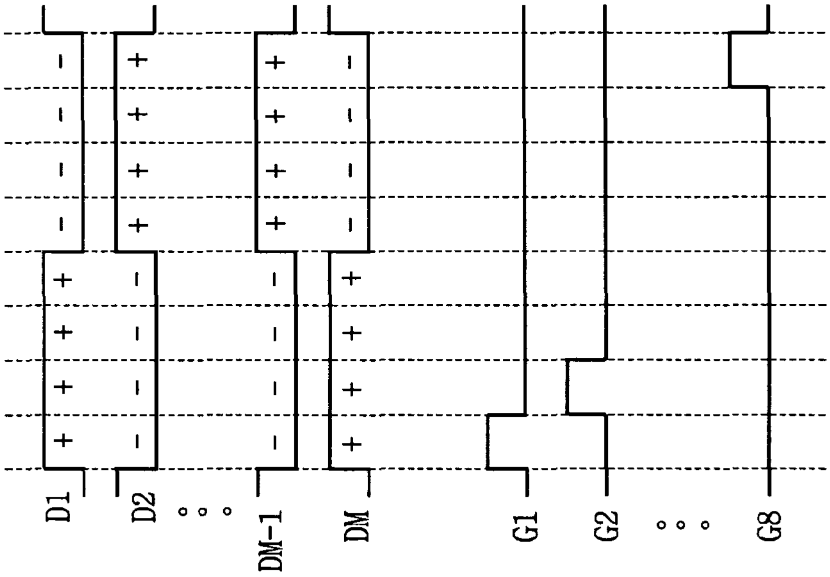
FIG. 8 shows the polarities of data applied to the data lines from a data drive circuit according to the first embodiment of the present invention.

FIG. 7 is a schematic view illustrating the polarities of data an LCD device according to the first embodiment of the present invention, and FIG. 8 shows the polarities of data applied to the data lines from a data drive circuit according to the first embodiment of the present invention.

Referring to FIG. 7, the LCD device according to the first embodiment of the present invention has an effective pixel group formed in an effective display area and a dummy pixel group formed outside the effective display area.

Dummy pixels outside the effective display area do not contribute to displaying images even though data are supplied. The source electrodes of the dummy pixels outside the effective display area corresponding to $(8n-5)^{th}$, $(8n-4)^{th}$, $(8n-3)^{th}$ and $(8n-2)^{th}$ (n is an integer) horizontal lines are connected to the first data line D1 and the source electrodes of the effective pixels corresponding to $(8n-5)^{th}$, $(8n-4)^{th}$, (8n-

3)$^{th}$ and (8n−2)$^{th}$ (n is an integer) horizontal lines are connected to the data lines starting from the data line D2.

For example, the source electrodes of the dummy pixels outside the effective display area corresponding to the third to sixth horizontal lines HL3 to HL6 are connected to the first data line D1 and the source electrodes of the effective pixels corresponding to the third to sixth horizontal lines HL3 to HL6 are connected to the data lines starting from the data line D2.

Referring to FIG. 8, the polarities of data applied to the data line D1 to Dm from the data drive circuit 132 are inverted every four horizontal periods and the polarities of data applied to the odd number data lines are opposite to the polarities of data applied to the even number data lines. However, because of the configuration between the source electrodes of the TFTs and the data lines D1 to Dm, the polarities of the effective pixels are inverted every two horizontal periods.

The data on the first data line D1 are supplied to the dummy pixels corresponding to the third to sixth horizontal lines HL3 to HL6 and the data on the second data line D2 are supplied to the first effective pixels corresponding to the third to sixth horizontal lines HL3 to HL6. The data on the first data line D1 are also supplied to the first effective pixels corresponding to the first, second, seventh and eighth horizontal lines HL1, HL2, HL7, HL8. Because the dummy pixels are not formed in outside the effective display area of the first, second, seventh and eighth horizontal lines HL1, HL2, HL7, HL8, the data on the first data line D1 are supplied to the first effective pixels corresponding to the first, second, seventh and eighth horizontal lines HL1, HL2, HL7, HL8 through the first data line D1.

As a result, the power consumption of the LCD device can be reduced by decreasing the driving frequency of the data drive circuit 132 to ½ without compromising display quality.

Figure 9:
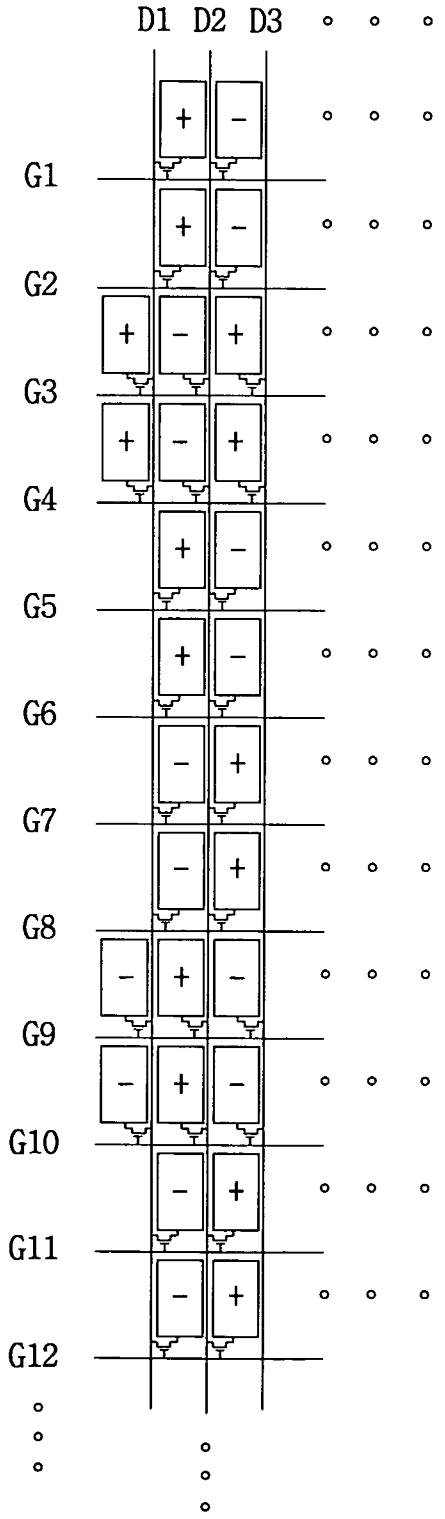
FIG. 9 is a schematic view illustrating the polarities of data applied to an LCD device according to the second embodiment of the present invention.
Figure 10:
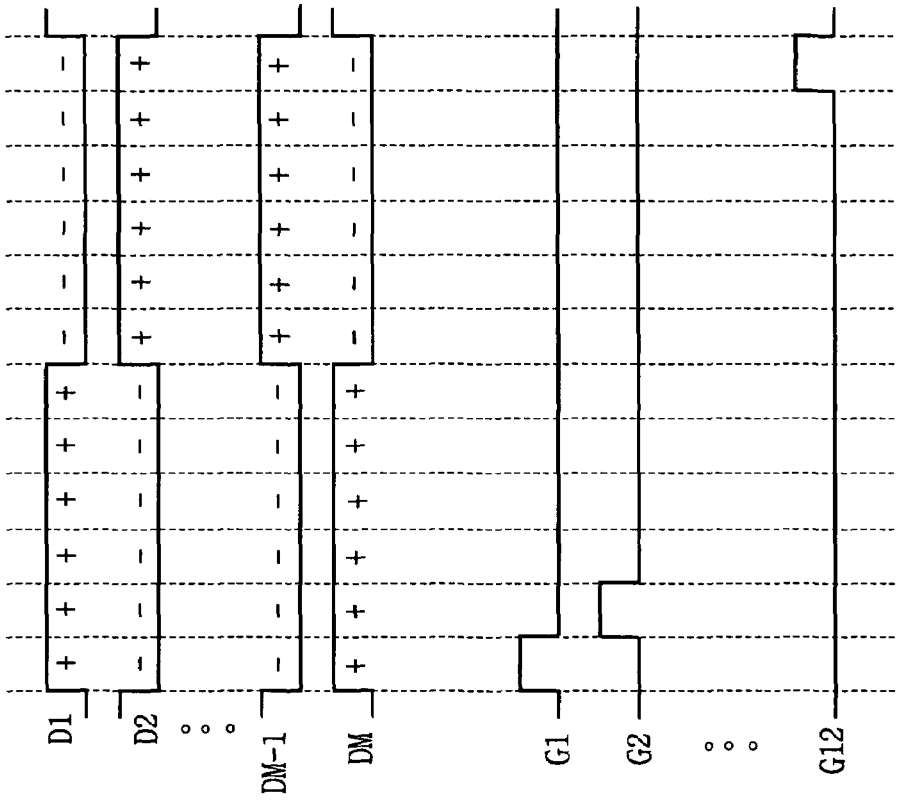
FIG. 10 shows the polarities of data applied to the data lines from a data drive circuit according to the second embodiment of the present invention.

FIG. 9 is a schematic view illustrating the polarities of data applied to an LCD device according to the second embodiment of the present invention. FIG. 10 shows the polarities of data applied to the data lines from a data drive circuit according to the second embodiment of the present invention.

Referring to FIG. 9, the LCD device according to the second embodiment of the present invention has an effective pixel group formed in an effective display area and a dummy pixel group formed outside the effective display area.

The source electrodes of dummy pixels outside the effective display area corresponding to (6n−3)$^{th}$ and (6n−2)$^{th}$ (n is an integer) horizontal lines are connected to the first data line D1 and the source electrodes of the effective pixels corresponding to (6n−3)$^{th}$ and (6n−2)$^{th}$ (n is an integer) horizontal lines are connected to the data lines starting from the data line D2.

For example, the source electrodes of the dummy pixels outside the effective display area corresponding to the third, fourth, ninth and tenth horizontal lines HL3, HL4, HL9, HL10 are connected to the first data line D1 and the source electrodes of the effective pixels corresponding to the third, fourth, ninth and tenth horizontal lines HL3, HL4, HL9, HL10 are connected to the data lines starting from the data line D2.

Referring to FIG. 10, the polarities of data applied to the data line D1 to Dm from the data drive circuit 132 are inverted every six horizontal periods and the polarities of data applied to the odd number data lines are opposite to the polarities of data applied to the even number data lines. However, because of the configuration between the source electrodes of the TFTs and the data lines D1 to Dm, the polarities of the effective pixels are inverted every two horizontal periods.

The data on the first data line D1 are supplied to the dummy pixels corresponding to the third, fourth, ninth and tenth horizontal lines HL3, HL4, HL9, HL10, and the data on the second data line D2 are supplied to the first effective pixels corresponding to the third, fourth, ninth and tenth horizontal lines HL3, HL4, HL9, HL10. The data on the first data line D1 are also supplied to the first effective pixels corresponding to the first, second, fifth to eighth, eleventh and twelfth horizontal lines HL1, HL2, HL5 to HL8, HL11, HL12. Because the dummy pixels are not formed in outside the effective display area of the first, second, fifth to eighth, eleventh and twelfth horizontal lines HL1, HL2, HL5 to HL8, HL11, HL12, the data on the first data line D1 are supplied to the first effective pixels corresponding to the first, second, fifth to eighth, eleventh and twelfth horizontal lines HL1, HL2, HL5 to HL8, HL11, HL12.

As a result, the power consumption of the LCD device can be reduced by decreasing the driving frequency of the data drive circuit 132 to ⅓ without compromising display quality.

Figure 11:
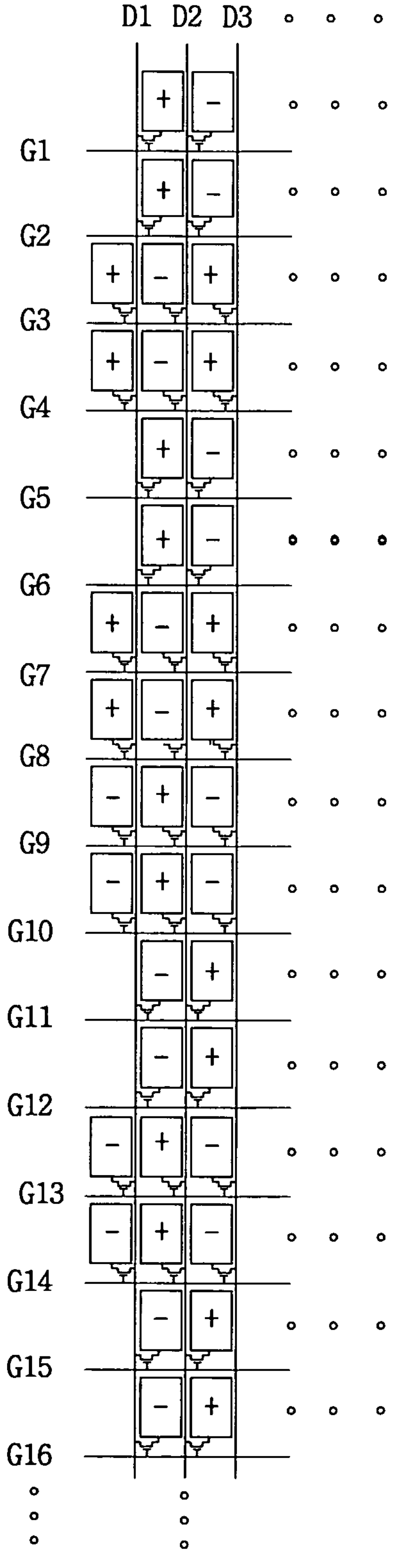
FIG. 11 is a schematic view illustrating the polarities of data applied to an LCD device according to the third embodiment of the present invention.
Figure 12:
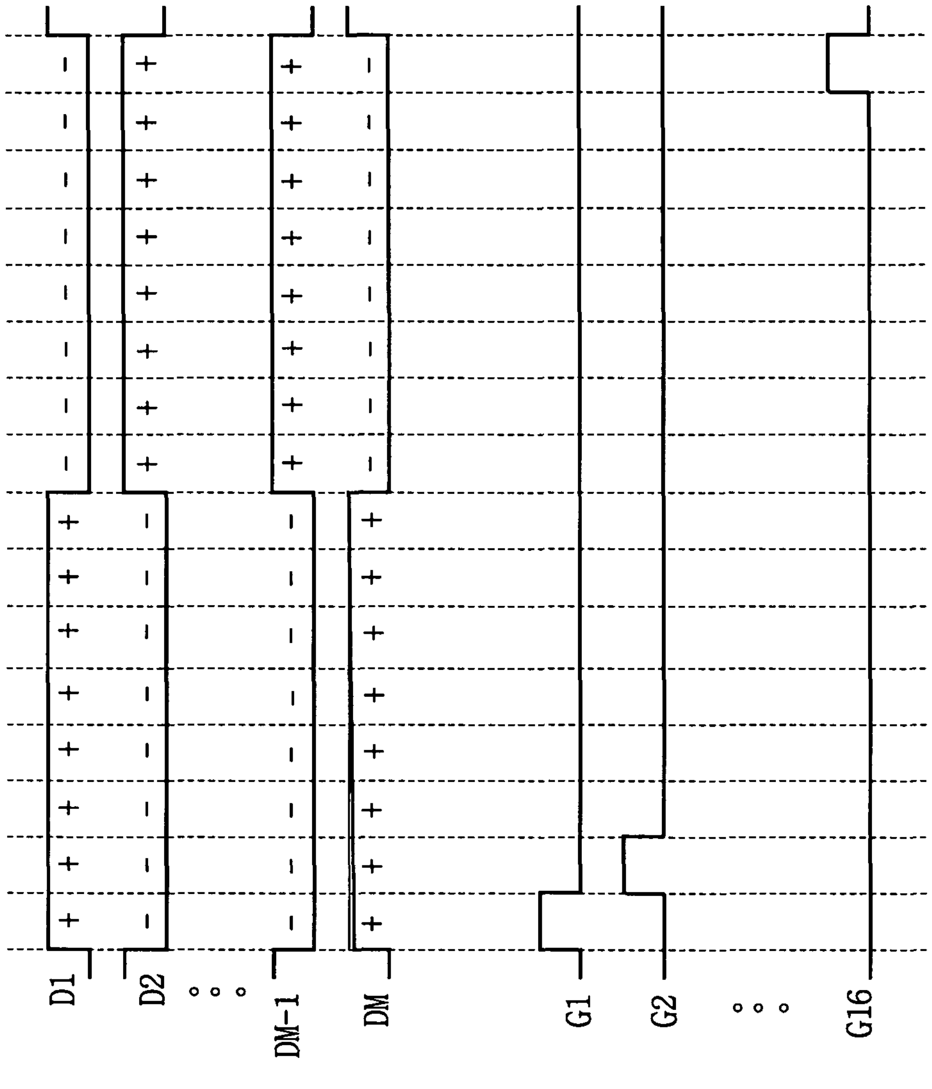
FIG. 12 shows the polarities of data applied to the data lines from a data drive circuit according to the third embodiment of the present invention.

FIG. 11 is a schematic view illustrating the polarities of data applied to an LCD device according to the third embodiment of the present invention. FIG. 12 shows the polarities of data applied to the data lines from a data drive circuit according to the third embodiment of the present invention.

Referring to FIG. 11, the LCD device according to the second third embodiment of the present invention has an effective pixel group formed in an effective display area and a dummy pixel group formed outside the effective display area.

The source electrodes of dummy pixels outside the effective display area corresponding to (16n−13)$^{th}$, (16n−12)$^{th}$, (16n−9)$^{th}$, (16n−8)$^{th}$, (16n−7)$^{th}$, (16n−6)$^{th}$, (16n−3)$^{th}$ and (16n−2)$^{th}$ (n is an integer) horizontal lines are connected to the first data line D1 and the source electrodes of the effective pixels corresponding to (16n−13)$^{th}$, (16n−12)$^{th}$, (16n−9)$^{th}$, (16n−8)$^{th}$, (16n−7)$^{th}$, (16n−6)$^{th}$, (16n−3)$^{th}$ and (16n−2)$^{th}$ (n is an integer) horizontal lines are connected to the data lines starting from the data line D2.

For example, the source electrodes of the dummy pixels outside the effective display area corresponding to the third, fourth, seventh to tenth, thirteenth, fourteenth, nineteenth and twentieth horizontal lines HL3, HL4, HL7 to HL10, HL13, HL14, HL19, HL20 are connected to the first data line D1 and the source electrodes of the effective pixels corresponding to the third, fourth, seventh to tenth, thirteenth, fourteenth, nineteenth and twentieth horizontal lines HL3, HL4, HL7 to HL10, HL13, HL14, HL19 and HL20 are connected to the data lines starting from the data line D2.

Referring to FIG. 12, the polarities of data applied to the data line D1 to Dm from the data drive circuit 132 are inverted every eight horizontal periods and the polarities of data applied to the odd number data lines are opposite to the polarities of data applied to the even number data lines. However, because of the configuration between the source electrodes of the TFTs and the data lines D1 to Dm, the polarities of the effective pixels are inverted every two horizontal periods.

The data on the first data line D1 are supplied to the dummy pixels corresponding to the third, fourth, seventh to tenth, thirteenth and fourteenth horizontal lines HL3, HL4, HL7 to HL10, HL13, HL14, and the data on the second data line D2 are supplied to the first effective pixels corresponding to the third, fourth, seventh to tenth, thirteenth and fourteenth horizontal lines HL3, HL4, HL7 to HL10, HL13, HL14. The data on the first data line D1 are also supplied to the first effective pixels corresponding to the first, second, fifth, sixth, eleventh, twelfth, fifteenth and sixteenth horizontal lines HL1, HL2, HL5 to HL8, HL11, HL12. Because the dummy pixels are not formed in outside the effective display area of the first, second, fifth, sixth, eleventh, twelfth, fifteenth and sixteenth horizontal lines HL1, HL2, HL5 to HL8, HL11, HL12, the data on the first data line D1 are supplied to the first effective pixels corresponding to the first, second, fifth, sixth, eleventh, twelfth, fifteenth and sixteenth horizontal lines HL1, HL2, HL5 to HL8, HL11, HL12.

As a result, the power consumption of the LCD device can be further reduced by decreasing the driving frequency of the data drive circuit 132 to ¼ without compromising display quality.

In the first to third embodiments, the two dot inversion method with a smaller driving frequency is realized by modulating data applied to the data lines and configuration of the data lines, TFTs and dummy pixels. However, it should be understood that the principles of the present invention can be applicable to an LCD device without dummy pixels by further modulating data applied to the data lines. It should be also understood that the principles of the present invention can be applicable to an LCD device driven by a more than two dot inversion method such as a three dot inversion method by modulating data applied to the data lines and configuration of the data lines and TFTs.

As described above, an LCD device according to the present invention is driven by the two dot inversion method in which the polarities of data applied to the data line D1 to Dm from the data drive circuit 132 are inverted every 2k horizontal periods (k is an integer not less than 2). As a result, the driving frequency of the data drive circuit and the power consumption of the LCD device are reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:

a data drive circuit that inverts polarities of data every 2k horizontal periods that are less than a frame interval for each frame (k is an integer not less than 2); and an LCD panel including a plurality of data lines and a plurality of gate lines crossing each other to define a plurality of effective pixels formed in an effective display area and a plurality of dummy pixels formed outside the effective display area, each of the effective and dummy pixels including a switching device, wherein the LCD panel further comprises first horizontal lines having the plurality of effective pixels, and second horizontal lines having the plurality of effective pixels and the plurality of dummy pixels, wherein first switching devices connected to the first horizontal lines and second switching devices connected to the second horizontal lines are arranged in a zigzag on the LCD panel, wherein source electrodes of the first switching devices connected to the first horizontal lines are connected to the data lines arranged on the left side of the first switching devices, wherein source electrodes of the second switching devices connected to the second horizontal lines are connected to the data lines arranged on the right side of the second switching devices.

2. The LCD device according to claim 1, wherein the data drive circuit inverts the polarities of the data every 4 horizontal periods.

3. The LCD device according to claim 2, wherein the source electrodes of the switching devices connected to $(8n-5)^{th}$, $(8n-4)^{th}$, $(8n-3)^{th}$ and $(8n-2)^{th}$ (n is an integer) gate lines are connected to the same data line.

4. The LCD device according to claim 3, wherein the plurality of the dummy pixels of the second horizontal lines are connected to the $(8n-5)^{th}$, $(8n-4)^{th}$, $(8n-3)^{th}$ and $(8n-2)^{th}$ (n is an integer) gate lines.

5. The LCD device according to claim 4, wherein the dummy pixels are connected to the same data line.

6. The LCD device according to claim 1, wherein the data drive circuit inverts the polarities of the data every 6 horizontal periods.

7. The LCD device according to claim 6, wherein the source electrodes of the switching devices connected to $(6n-3)^{th}$ and $(6n-2)^{th}$ (n is an integer) gate lines are connected to the same data line.

8. The LCD device according to claim 7, wherein the plurality of the dummy pixels of the second horizontal lines are connected to the $(6n-3)^{th}$ and $(6n-2)^{th}$ (n is an integer) gate lines.

9. The LCD device according to claim 8, wherein the dummy pixels are connected to the same data line.

10. The LCD device according to claim 1, wherein the data drive circuit inverts the polarity of the data every 8 horizontal periods.

11. The LCD device according to claim 10, wherein the source electrodes of the switching devices connected to $(16n-13)^{th}$, $(16n-12)^{th}$, $(16n-9)^{th}$ to $(16n-6)^{th}$, $(16n-3)^{th}$ and $(16n-2)^{th}$ (n is an integer) gate lines are connected to the same data line.

12. The LCD device according to claim 11, wherein the plurality of the dummy pixels of the second horizontal lines are connected to the $(16n-13)^{th}$, $(16n-12)^{th}$, $(16n-9)^{th}$ to $(16n-6)^{th}$, $(16n-3)^{th}$ and $(16n-2)^{th}$ (n is an integer).

13. The LCD device according to claim 12, wherein the dummy pixels are connected to the same data line.

14. A driving method of a liquid crystal display (LCD) device, comprising:

providing an LCD panel wherein a plurality of data lines and a plurality of gate lines cross each other to define a plurality of effective pixels, formed in an effective display area and a plurality of dummy pixels formed outside the effective display area, each of the effective and dummy pixels includes a switching device, inverting polarities of data every 2k horizontal periods that are less than a frame interval for each frame (k is an integer not less than 2), and applying the data to one of the data lines, wherein the polarities of data applied to the pixels of one of the columns are inverted every two pixels for each frame, and wherein polarities of data flowing through the two adjacent data lines are opposite each other, wherein the LCD panel further comprises first horizontal lines having the plurality of effective pixels, and second horizontal lines having the plurality of effective pixels and the plurality of dummy pixels, wherein first switching devices connected to the first horizontal lines and second switching devices connected to the second horizontal lines are arranged in a zigzag on the LCD panel, wherein source electrodes of the first switching devices connected to the first horizontal lines are connected to the data lines arranged on the left side of the first switching devices, wherein source electrodes of the second switching devices connected to the second horizontal lines are connected to the data lines arranged on in the right side of the second switching devices.

15. The driving method according to claim 14, wherein the polarities of the data are inverted every 4 horizontal periods.

16. The driving method according to claim 14, wherein the polarities of the data are inverted every 6 horizontal periods.

17. The driving method according to claim 14, wherein the polarities of the data are inverted every 8 horizontal periods.

18. A driving method of a display device, comprising:

providing a display panel wherein a plurality of data lines and a plurality of gate lines cross each other to define a plurality of effective pixels formed in an effective display area and a plurality of dummy pixels formed outside the effective display area, each of the effective and dummy pixels including a switching device; and inverting polarities of data corresponding to at least four horizontal periods and applying the data to one of the data lines, wherein the polarities of data applied to the pixels of one of the columns are inverted every two pixels for each frame, wherein the LCD panel further comprises first horizontal lines having the plurality of effective pixels, and second horizontal lines having the plurality of effective pixels and the plurality of dummy pixels, wherein first switching devices connected to the first horizontal lines and second switching devices connected to the second horizontal lines are arranged in a zigzag on the LCD panel, wherein source electrodes of the first switching devices connected to the first horizontal lines are connected to the data lines arranged on the left side of the first switching devices, wherein source electrodes of the second switching devices connected to the second horizontal lines are connected to the data line arranged on the right side of the second switching devices.

* * * * *